(No Model.) 5 Sheets—Sheet 2.

T. V. ALLIS.
ROD MILL PLANT.

No. 461,900. Patented Oct. 27, 1891.

INVENTOR:
T. V. Allis
By A. P. Thayer atty
WITNESSES:
Ernst Lundgren
W. B. Earll (No Model.)
T. V. ALLIS.
ROD MILL PLANT.
No. 461,900.
5 Sheets—Sheet 3.
Patented Oct. 27, 1891.
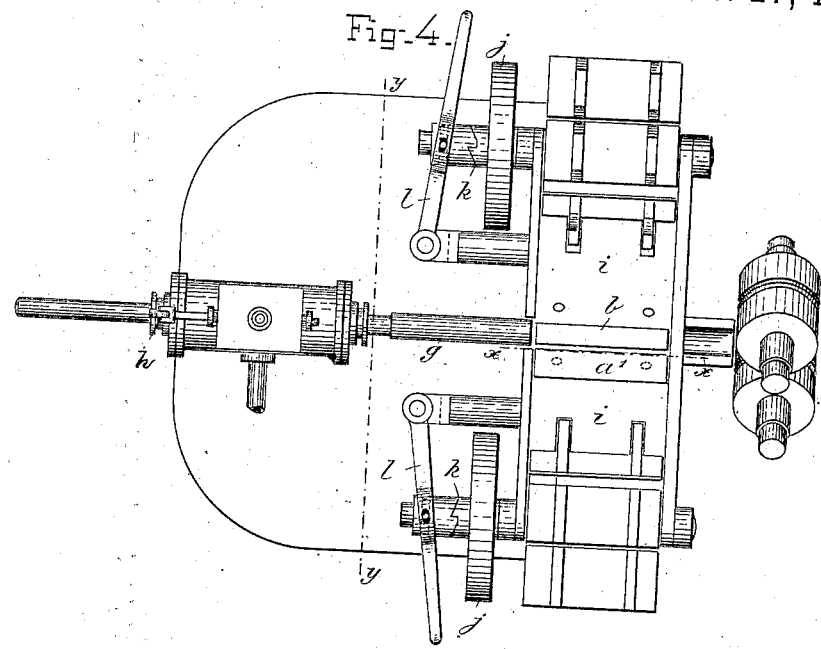
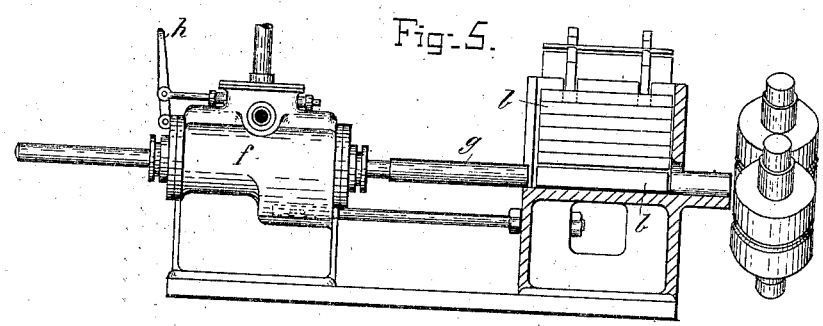
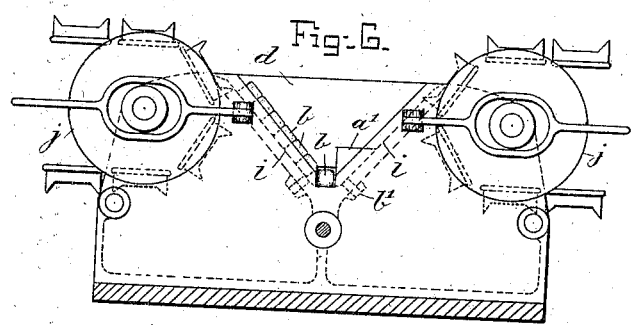
WITNESSES.
Ernst Lundgren
W. O. Caill
INVENTOR.
Thos V Allis
By A P Thayer
atty

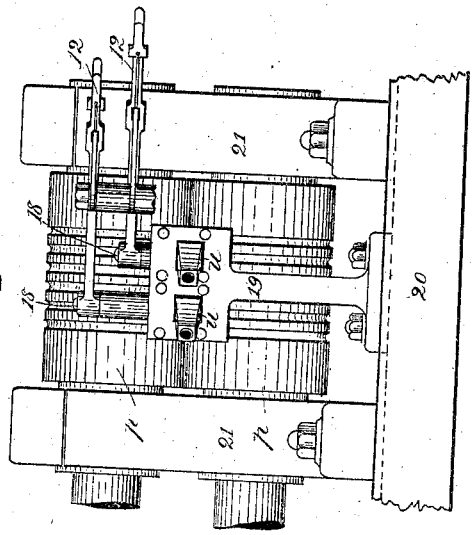

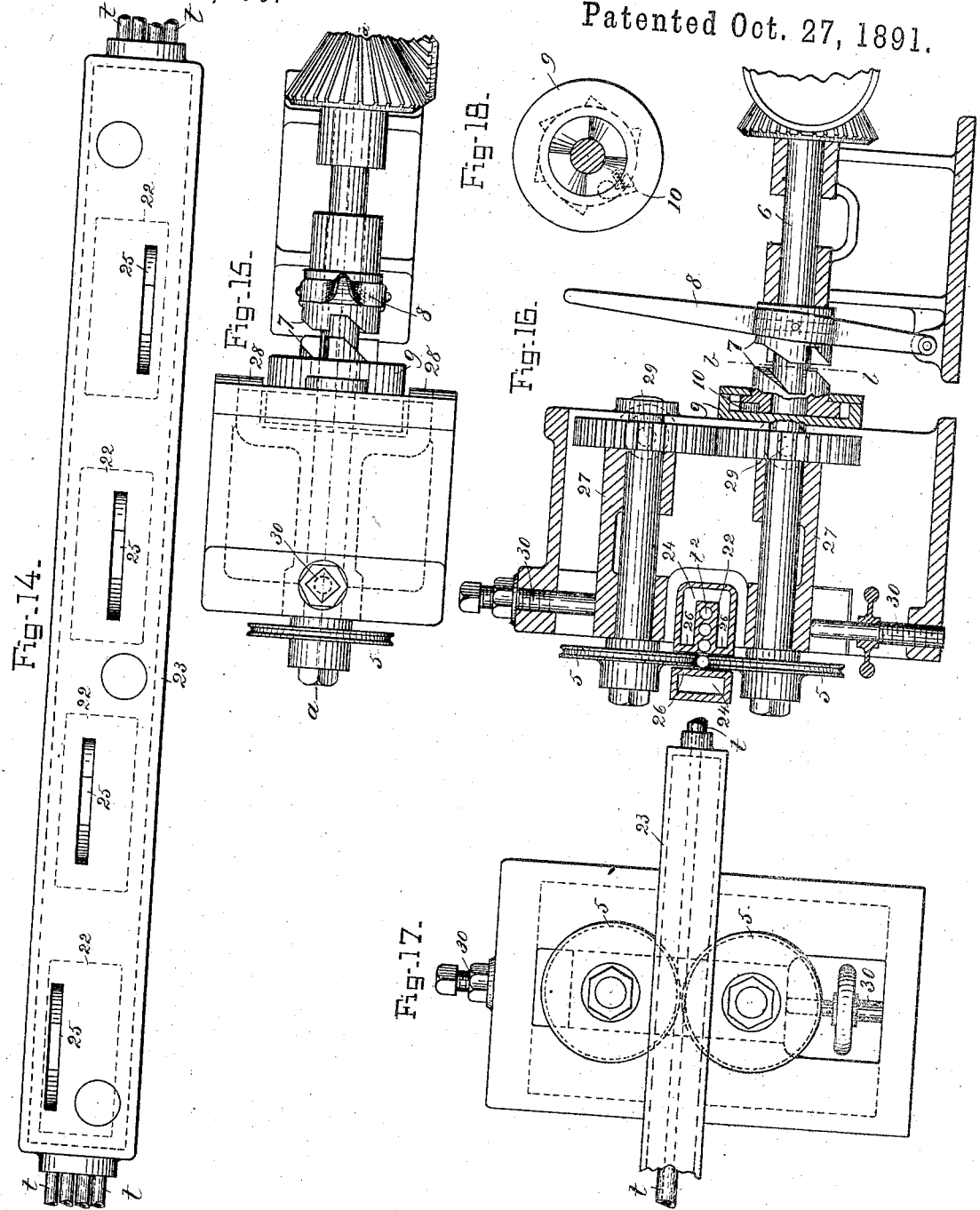

UNITED STATES PATENT OFFICE.

THOMAS V. ALLIS, OF NEW YORK, N. Y.

ROD-MILL PLANT.

SPECIFICATION forming part of Letters Patent No. 461,900, dated October 27, 1891.

Application filed November 15, 1890. Serial No. 371,564. (No model.)

*To all whom it may concern:*

Be it known that I, THOMAS V. ALLIS, a citizen of the United States, and a resident of New York city, in the county and State of New York, have invented new and useful Improvements in a Rod-Mill Plant, of which the following is a specification.

My invention relates to a plant or apparatus for producing wire rods and strips from billets or blooms in a continuous process by a series of trains of rolls and transfer apparatus having various novel features of improvement adapted to facilitate the work and economize the cost, all as hereinafter fully described, reference being made to the accompanying drawings, in which—

Figure 1:
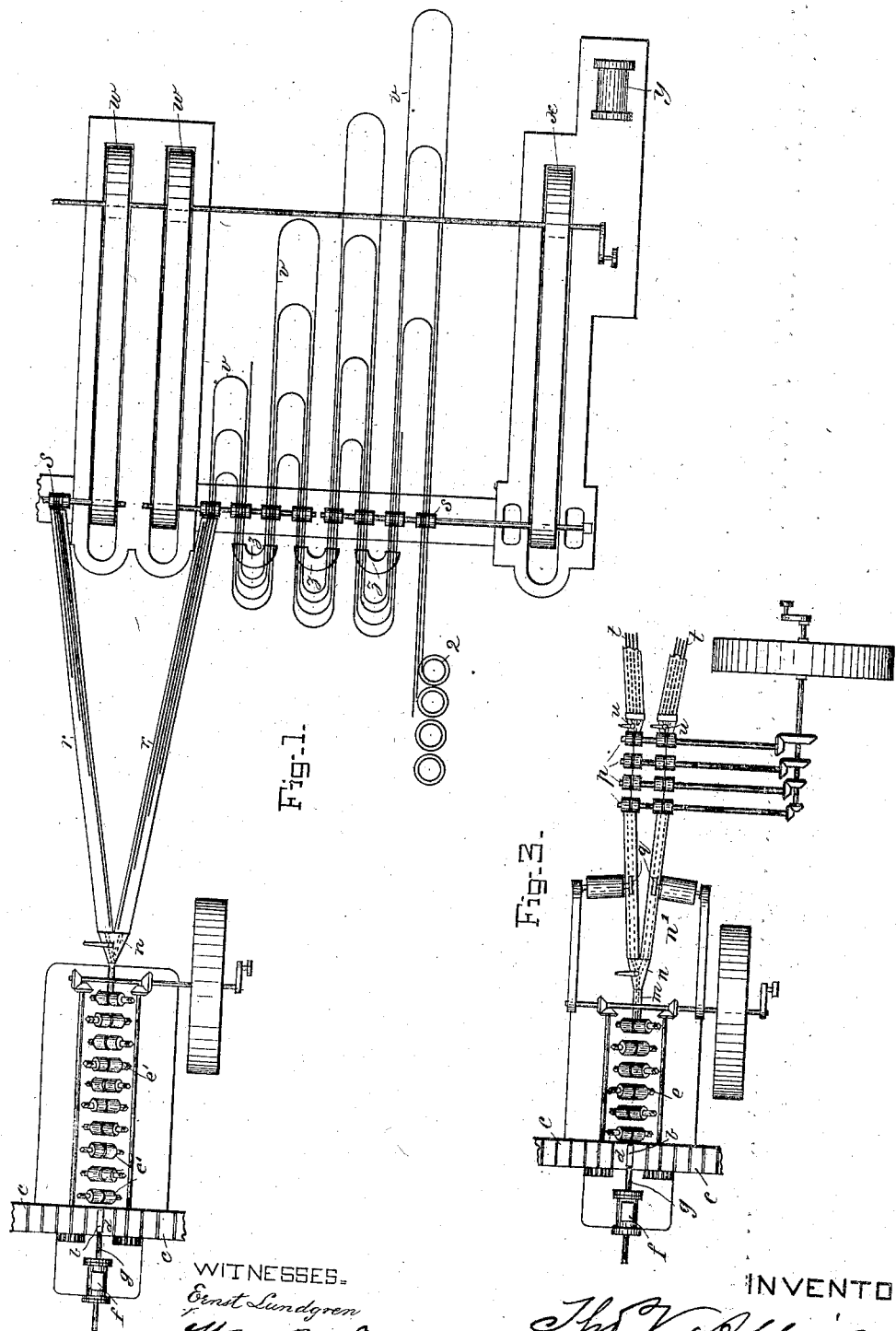
Figure 2:
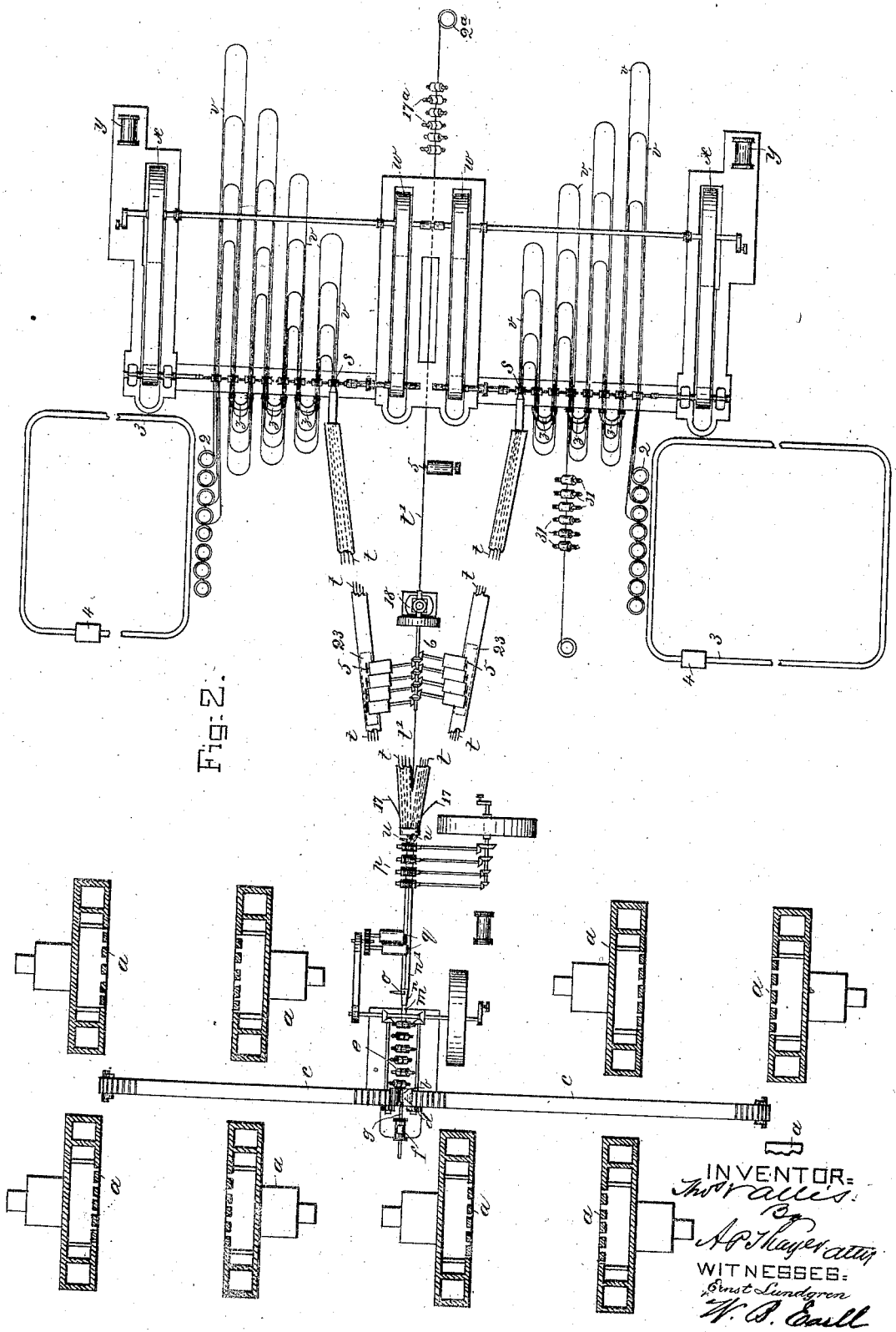

Figure 1 is a diagram illustrating the essential features of my improved plant in the simplest and most preferable arrangement. Fig. 2 is a similar but more general outline of the plant with some additional appliances that it may be desirable to employ in some cases. Fig. 3 is a plan view of some parts, illustrating a modification of some of the appliances of Fig. 2, that may be employed, if desired. Fig. 4 is a plan view of apparatus for receiving the billets from the furnaces and delivering them into the roughing or breaking-down rolls. Fig. 5 is partly a side elevation and partly a sectional elevation of the said receiving and delivering apparatus, the section being taken on line $x\ x$ of Fig. 4. Fig. 6 is a transverse section on line $y\ y$, Fig. 4. Fig. 7 is a plan view, and Fig. 8 a side elevation, of a branched guideway and switch for transferring the partly-reduced billets from the roughing-rolls to a train of intermediate rolls. Fig. 9 is a transverse section of said guideway on line $z\ z$ of Figs. 7 and 8. Fig. 10 is a transverse section of the same on line $w\ w$, Figs. 7 and 8. Fig. 11 is a plan view of the housings and plan view of the delivery-rolls of the intermediate train, also of part of the guideways, into which the partly-formed rods are delivered from the intermediate train of rolls to be transferred to the finishing-rolls, and switches for directing the rods to the different guideways. Fig. 12 is an elevation of the delivery side of said rolls and switches. Fig. 13 is a side elevation of the apparatus of Fig. 11 as seen in the direction indicated by the arrow. Fig. 14 is a plan view of an intermediate portion of said guideways through which the partly-formed rods are transferred from the intermediate rolls to the finishing-rolls. Fig. 15 is a plan view of a pair of feed-rolls used in connection with said guideway for the transfer of the said partly-formed rods from the intermediate rolls to the finishing-rolls. Fig. 16 is a longitudinal sectional elevation of said feed-rolls on line $a\ a$, Fig. 15. Fig. 17 is an end elevation of said rolls; and Fig. 18 is a detail of the feed-roll apparatus in section on line $b\ b$, Fig. 16.

Referring more particularly to Fig. 2, which includes the complement of appliances for the more elaborate arrangement of the plant, the devices indicated at $a$ are intended to represent a series of furnaces for heating the billets $b$, arranged in two parallel lines, between which are two endless carriers $c$, both arranged in a line and running to and discharging into the billet-pocket $d$, located in the center of the field of the furnaces or thereabout, and at the head of the roughing-train of rolls $e$ or $e'$, so that the billets may be readily handed from any one of the furnaces onto a carrier and be automatically delivered into the pocket from which they are to be pushed forward successively into the roughing-rolls, for which a hydraulic, steam, or pneumatic pusher $f$ is provided, of which the reciprocating rod $g$ is arranged in the line of the pocket and the passway of the rolls suitably for forcing the billets forward thereto from the bottom of the pocket when the impelling force is admitted to the pusher, the valve of which is to be operated by an attendant at the proper times by the lever $h$, Figs. 4 and 5. The pocket has inclined sides $i$, onto which the billets are discharged from either side by the carriers, respectively, and down which they gravitate to a position in line with the passway and the pusher-rod. A detachably-fastened stop-ledge $a'$ is provided for arresting and gaging the billets on the line of the feedway. It is temporarily fastened by pins $b'$ to the lower portion of the opposite side $i$ of the hopper from which the billets are received and prevents the lower billets from being crowded over too far by the others following and may be shifted from one side to the other.

Power is applied to the pulleys $j$ for driving the carriers. Said pulleys are coupled with the driving-shafts by clutches $k$ and levers $l$ for disconnecting one carrier when not in use. The roughing-train of rolls $e\ e'$ may consist of any approved arrangement of a series of pairs of rolls placed in line in close proximity and at right angles successively and including a sufficient number of pairs to reduce a billet of, say, four inches square, or thereabout, to one and a quarter inches square, or thereabout, for further reduction in the intermediate train $p$; or it may include, say, ten pairs of rolls for reducing to a half or five-eighths, or thereabout, to be fed directly to the finishing-trains. The arrangement of rolls that I prefer for the roughing-train are the oppositely-inclined pairs alternately in planes of forty-five degrees to the horizontal plane, as indicated in the drawings, preferably employing a single short train $e'$ of, say, ten pairs of rolls, as in Fig. 1, for reducing the billets sufficiently to be thereafter worked in the "doubling-in" rolls, to which they may be handed directly from the floor or from troughs $r$ or other feedways, to which the bars are delivered from said train; but I may use an intermediate train, as in the arrangement of Fig. 2, wherein the bars of, say, an inch to an inch and a quarter in diameter are delivered from a still shorter roughing-train into a guideway $m$, that is branched at $n$ and provided with a switch $o$, by which the rods may be directed into either of the branches $n'$ of said guideway, which conduct the rods to the intermediate train of rolls $p$, having passes for each branch-guideway $n'$, these rolls being arranged horizontally, so that two rods may be simultaneously worked in their different passes. At about the middle of the guideways $n'$ a pair of feed-rolls $q$ is provided to each for feeding the rods intermediately—that is, after leaving the roughing-rolls and before entering the intermediate rolls—the distance between the two trains being greater than the length of the bars, and because the bars feed better with the assistance of said rolls in this locality than if dependent wholly on the push of the roughing-rolls until gripped by the intermediate rolls.

Owing to the elongation of the billet or bar at every pass, the speed of each successive pair of rolls has to be proportionately increased, and as a means of avoiding excessive speed of the rolls toward the last end of the roughing-mill when arranged in the longer train $e'$, I have introduced the intermediate duplex system whereby the output of the shorter primary train $e$ may be further reduced in the intermediate train $p$ to the size for the finishing-trains at slower speed than that of the corresponding rolls of the longer train $e'$. It will be seen that the short train $e$ may then be run up to the highest practicable limit for it and the intermediate train also, and thus the full capacity of each is available to utilize the heat of the billets to the best advantage in the process of reduction and to obtain the greatest quantity of output.

It will be seen that with only one pass through the intermediate train only half the product of the roughing-train at full speed could be disposed of. Hence by providing two passes in the intermediate rolls and the branched guideway and switch the intermediate rolls are adapted for receiving and disposing of the full product of the roughing-train by shifting the switch so as to direct the bars from the roughing-train into the different branches of the guideway and passes of the rolls alternately.

I desire it to be understood that I do not mean to be limited to the two passes in one pair of rolls, as above described, for I may use two separate pairs of rolls, one for each pass, said rolls being placed side by side in different housings, as represented in Fig. 3. In such case the branches of the guideways would diverge to a greater extent; but in using separate rolls it may be preferred to employ two independent trains, in which the rolls are arranged at right angles in inclined planes like the roughing-rolls, which avoids the use of the twist-guide that has to be employed for turning the rods when the rolls are all in the same plane, as in train $p$. With these short and consequently higher speed trains of roughing-rolls, either singly or with the intermediate train, rapidly reducing the billets to bars of about one-half to five-eighths of an inch square or diameter, I provide for completing the reduction of the bars to wire-rod sizes with the same rapidity by the employment of one or two finishing-trains of doubling-in rolls, as $s$, Figs. 1 and 2, placed a suitable distance from the roughing-trains—i. e., equal to or greater than the length of the bars from the roughing-trains and transversely to the line of said roughing-trains— with several passes in each pair, to which the bars may be handed by an attendant, as in Fig. 1; or a number of guideways $t$ may be provided, as in Fig. 2, respectively communicating therewith, into which guideways the rods issuing from the intermediate rolls are respectively directed by switch-guides $u$, one of which delivers into the guideways of one of said finishing-trains and the other into the guideways of the other finishing-train, so that the bars issuing from the roughing-train or those from the intermediate train, which are still further elongated, are distributed to as many passes in the two finishing-trains as may be practicable or necessary for finishing the rods as fast as delivered from the roughing-trains, and thus provide a plant adapted for turning out more product in a given time and with a given amount of apparatus than as hitherto arranged. The two sections of each of these doubling-in trains S and S are divided, preferably, in the center, each section driven at different speeds with separate driving-pulleys, as W and X. The finishing-section being driven by the larger pulley X has a higher speed than the other driven by the smaller pulley W. The pairs of rolls of each section also vary in diameter, being smaller at the beginning and increasing toward the ending of each section in the direction of delivery. The purpose of this progressively-increasing circumferential speed of rolls, due to both the increase in diameter and the speed of driving, is to prevent the forming of excessively long loops V through the elongation of the rods as they become attenuated by reduction in size. The two drivers W and X for each train are preferably geared with the one engine Y. In these trains the rods are turned on that side of the rolls where they issue, in square form in the common manner for "edging" by the usual repeating-guides $z$. On the other side, where they issue in oval form, it is the practice to turn them by hand. After being turned by the repeating-guide $z$ and entered in the pass of the next pair of rolls the loops overrun the guides by increasing in length, as indicated. From the last pair of rolls the rods are conducted in the usual manner to reels 2, of which I provide a series comprising double the number of reels as there are rods issuing from the rolls, to have an empty reel ready for every new rod issuing while the previously-filled reel is being discharged, and I arrange them in line with the issuing-passes (although they may be diverged) and alongside of a track 3, having on it a series of cars 4 for receiving and carrying the coils away in due succession. Besides these doubling-in finishing-rolls I also propose to provide for still greater capacity in the finishing part of the plant by the arrangement of a continuous train of rolls at $17^a$ in line with the roughing and intermediate train, but behind the doubling-in rolls, where it will be seen it is quite feasible to locate such a train without interference with the others, and so that the rods may be conducted to it from the intermediate rolls through a third guideway $t'$, placed intermediately to the guideways $t$, and into which rods may be directed from either of the passes of the intermediate rolls by either of the switch-guides $u$. It will be preferable to have these finishing-rolls arranged in the opposite incline alternately as the roughing-rolls are. The finished rods from them will be reeled at a suitable point beyond the end of the train, as on reel $2^a$.

If the single roughing-train is used, as in Fig. 1, and is slowed down in speed, only one finishing-train of rolls may serve; but two may be employed with diverging guideways $r$ and a branch $n$ and switch $o$, same as between the roughing and intermediate rolls of Figs. 2 and 3. It is important to have the roughing-rolls placed at right angles successively, because they can run much faster without the twist-guide that must be used when all arranged in one plane, such trains being practically capable of supplying bars as fast as two doubling-in mills having means of working a plurality of four rods each simultaneously can furnish them. I provide feed-rolls, as 5, to the feedways $t\ t'$, same as to the guideways to the intermediate rolls and similarly located about the middle of said feedways lengthwise, said rolls being coupled with the driving-shaft 6 by a clutch 7 and lever 8 for stopping and starting them as required, and they are also geared therewith by the internally-toothed ratchet 9 on the roll-shaft and the pawl 10 on the loose part of the clutch for allowing the feed-rolls to overrun the driving-shaft for the more speedy passage of the rods after entering the doubling-in rolls, so as to be gripped thereby, said rolls having greater surface speed than the feed-rolls. For the most part these guideways consist of tubes, as indicated at $t\ t'$, which connect at the receiving end with a head-piece 10, having a channel coincident with each tube and being at its front end curved at 11 conformably to the sweeps of the switch-guides $u$, respectively, when being shifted and set by the levers 12, each connected, respectively, with any one of its divisions of guideways leading to the doubling-in train and both with the intermediate guide to the continuous finishing-train. Besides these guideways said head 10 also has an offshoot-guide 17 at each side, through which the rods may be switched off to be discharged on the floor for relief, in case of accident to the finishing-trains, until the mill can be stopped.

The head-piece 10 is of necessity permanently fixed in position, which makes it necessary, also, that the pivots 18, on which the switch-guides turn, be also mounted in a fixed position in order to register properly with the guideways of the head. Said pivots are therefore mounted on the stand 19, seated on the bed-frame 20, between the roll-housings 21, and the housings are adjustably fastened on the bed-frame 20, to be shifted laterally thereon to adjust the different roll-grooves to the switch-guides as new grooves are to be substituted for others worn out.

Where the feed-rolls 5 are applied to the guide-channels, I provide a cast-metal section 22, having a passage $t^2$, into which the tubes connect at the ends, respectively, said section being inclosed in a hollow shell 23, in which there is intermediate space 24, by which to surround the guideways 22 with a non-conducting substance to protect the rods from loss of heat as much as possible; but where the slots 25 are made for admitting the feed-rolls to the rods the shell 23 and the guideway-section 22 are joined by the integral partition-walls 26, which separate said roll-spaces and the said intermediate space and prevent escape of the insulating material into the roll-space. The guide-tubes may be for the rest of their length buried in sand or otherwise protected in an approved way. To adjust the feed-rolls accurately to these guideways they are mounted in the boxes 27, having the branches 28 at the ends of the roll-shafts, which are geared with the driving-power, pivoted to the housings at 29 and being at the ends next to the feed-rolls subject to the adjusting-screws 30, one of which is under the lower roll for shifting it upward and the other above the upper roll for shifting it downward.

It has of late been found practicably feasible to run a number of rods, as about four, through the rolls of a doubling-in train at the same time in different passes, as I have represented, said rods being previously sufficiently reduced for doubling in. It is managed by the attendant standing in suitable proximity to the delivering side of one pair of rolls and the entering side of the next pair to seize the issuing rod with his tongs a little back of the end and turn around, so as to bend the rod in a loop and enter the end in the pass of the next pair of rolls, said attendant being on the side of the rolls where the rods issue in oval form. The rods then issue on the other side in a flattened square form, and are automatically looped back and twisted a quarter of a turn and enter into the next pair of rolls by the usual repeating-guides. Then another attendant receives and returns the rods through the next pair of rolls, and so on throughout the train. With such trains thus having the greatest known capacity for finishing rods after having been reduced sufficiently for doubling in, as before stated, I combine roughing-trains also having greater capacity than any other roughing arrangement, as I have shown, and thus provide for a greater output than has thus far ever been attained. To illustrate the advantage of this arrangement more clearly, let it be understood that the output of a continuous train of rolls is governed by a certain limit of speed of the last pair of delivery-rolls, beyond which it is not feasible to run because of overheating, excessive wear and tear, and liabilities to accident. It is the last pair of rolls in the train that run at this high speed, because the speeds of the rolls have to increase from the first to the last pair successively, owing to the elongation and consequent increase of the speed of the rod in each pass. Hence the preceding rolls must of course run slower. It will be seen, then, that the shorter the trains the higher the speed of rolls may be in the average. For example, if both the roughing and intermediate trains were united in one, the average speed of what is now the roughing-train would have to be much less or that of the intermediate much higher in order that one should conform to the other; but as the breaking-down portion of a continuous mill has a greater capacity than has ever been developed it is my object to provide means for finishing a quantity of rods equal to the roughing capacity of a continuous train, and as the speed at which it is advisable to operate a continuous mill having rolls all in one plane is limited by the necessity of using twist-guides for giving a quarter-turn to the bars between each pair of rolls I have devised the duplex plan, whereby the rolls can be run at one-half the speed necessary were they adapted for passing but one rod at a time, and thus gain in output without so much risk of accident and wear to the twist-guides. With inclined rolls arranged in the opposite planes at an angle of about forty-five degrees the duplex system is not used, because in this plan twist-guides are not required, there simply being a straight guide from one pair of rolls to the other, which admits of a free and unobstructed passage of the bar in process of reduction at a high rate of speed without danger to the employés or machinery and without any unusual wear to the guides and avoiding the frequent delays which occur in the use of the twist-guides through choking and clogging due to the guides wearing out of shape.

I am aware that the Belgian or open-face mills have been used both for roughing down the billets and for finishing the rods; but they are manifestly slow in roughing because of the delay in passing the billets back and forth. I am also aware that continuous trains have been used both for roughing and finishing, which is a slow process in the roughing-train, as I have shown, and is also slow in the finishing-train, because with the larger number of rolls requisite for reducing the rods to the required size the average speed of the train is necessarily slow, as I have also shown, and but one rod can be passed through at a time, whereas in the doubling-in type of finishing-train as many as four rods, and possibly more, can be finished at once in the plurality of passes. With these finishing-rolls s I also combine a continuous train of strip-finishing rolls, as 31, to either one or both of the finishing-trains and in line with a pass of one of the pairs of the rolls thereof, so that when the reduction in the form of rods has reached the size to be thereafter flattened for strips one of the rods may be led off directly into the train of strip-finishing rolls instead of being continued in the rod-train, these rolls being all arranged in one plane, as required for rolling flat strips. In the drawings I have represented this strip-train located in the proper relation to the rod-train for receiving the rods in the proper size for making strips of about a sixteenth of an inch in thickness and three-quarters wide, which is a special size that is in demand; but it may be placed nearer to the receiving end of said train for larger strips or nearer to the finishing end for smaller strips; but for materially larger-sized hoops and the like, also large rods, the train at 17ª may be adapted for such product. It is not essential that these be continuous trains. It is obvious that they may be of the doubling-in form. Both the trains 17ª and 31 will have independent driving-power in any approved arrangement. Thus I continue rod and strip rolling in one plant, so as to avoid the trouble of changing any of the rolls and so that there is no interference whatever of the special appliances for either purposes, it being only necessary to direct the rods into the strip-rolling train 31 instead of permitting them to be looped back into the rod-rolls, which may be accomplished by hand with tongs or any approved guide may be introduced to direct the rods thereto instead of permitting them to continue in the doubling-in train; but they may be directed into the train 17ª, same as before described for rods. An essential advantage of this part of my invention is that, while the plant for rolling rods is alike applicable for rolling strips down to the point where the flattening begins, the demand for strips is not sufficient for the support of a plant of the great capacity that the trade in rods demands; yet such a plant has like economical advantages for strips over smaller plants as for rods, and is therefore to be desired for strips as well. The continuous train 17ª will also be useful in case of accident to one of the finishing-trains s.

What I desire to claim and secure by Letters Patent is—

1. In a rod-rolling plant, the combination of the continuous train of roughing-rolls in which the pairs of rolls are arranged at right angles to each other successively, a doubling-in finishing-train of rolls, and means for transferring the rods or bars to the finishing-train, substantially as described.

2. In a rod-rolling plant, the combination of a continuous train of roughing-rolls in which the pairs of rolls are arranged at right angles successively, and a doubling-in finishing-train of rolls having a plurality of passes in each pair of rolls, and means for transferring the rods or bars to the finishing-train in plurality, substantially as described.

3. In a rod-rolling plant, the combination of a continuous train of roughing-rolls in which the pairs of rolls are arranged at right angles successively, a doubling-in train having a plurality of passes in each pair of rolls, the first or receiving pair of rolls located at a distance from the continuous train equal to or greater than the length of bars to be delivered from the roughing-train, so that the bars run out of the roughing-train before entering the finishing-train, and means for transferring the bars to the finishing-train in plurality, said train placed transversely to the line of said roughing-train, substantially as described.

4. In a rod-rolling plant, the combination of the continuous train of roughing-rolls in which the pairs of rolls are arranged at right angles successively, two trains of doubling-in finishing-rolls placed transversely to the line of the roughing-train and having a plurality of passes in each pair of rolls, a branched feed trough or guideway having a corresponding plurality of feedways, and a switch for directing the rods from the roughing-train through said feedways to the finishing-trains and the passes thereof, respectively, substantially as described.

5. In a rod-rolling plant, the combination of the continuous train of roughing-rolls, a doubling-in train of finishing-rolls suitably placed for the delivery of the bars from the roughing-train before they enter the finishing-train, and a feed trough or guideway receiving the rods or bars from the roughing-train and conducting them to and delivering them in a suitable proximity to the finishing-train for being handed thereto, substantially as described.

6. In a rod-rolling plant, the combination of the continuous train of roughing-rolls, a doubling-in train of finishing-rolls having a plurality of passes in each pair of rolls and suitably placed for the delivery of the bars from the roughing-train before they enter the finishing-train, and a feed trough or guideway receiving the bars from the roughing-train and conducting them to and delivering them in a suitable proximity to the finishing-train for being handed thereto, substantially as described.

7. The combination of a continuous roughing-train in which the pairs of rolls are arranged at right angles successively, intermediate continuous dual-bar-reducing train, two finishing-trains of doubling-in rolls placed transversely to the line of the primary train and having a plurality of passes in each pair of rolls, and a plurality of guideways and switches connecting the passes of the primary trains and the finishing-trains, respectively, substantially as described.

8. The combination of the primary continuous train of roughing-rolls in which the pairs of rolls are arranged at right angles successively, intermediate continuous train of rolls having passes for two rods separately, the duplex guideway and switch connecting said trains, a system of finishing-trains having a plurality of passes in each pair of rolls, and a plurality of guideways and switches connecting the intermediate and finishing trains, substantially as described.

9. The combination of the primary continuous train of roughing-rolls in which the pairs of rolls are arranged at right angles successively, intermediate continuous train of rolls having passes for two rods separately, the duplex guideway and switch connecting said trains, two finishing-trains of doubling-in rolls placed transversely to the line of the continuous trains and having a plurality of passes in each pair of rolls, and a plurality of guideways and switches connecting the passes of the intermediate train and the finishing-trains, respectively, substantially as described.

10. The combination of the primary continuous train of roughing-rolls in which the pairs of rolls are arranged at right angles successively, intermediate continuous train of rolls having passes for two rods separately, the duplex guideway and switch connecting said trains, two finishing-trains of doubling-in rolls placed transversely to the line of the continuous trains and located at a distance from the roughing-train, so that the bars run out of the roughing-train before entering the finishing-train, said finishing-train having a plurality of passes in each pair of rolls, a continuous train of finishing-rolls placed in line of the roughing or primary train and beyond or back of the finishing-trains, a plurality of guideways and switches connecting the passes of the intermediate train and the doubling-in train, and an intermediate guideway connecting either of said switches and passes of the intermediate train with the continuous finishing-train, substantially as described.

11. The combination of the continuous train of roughing-rolls, a billet-receiving pocket in front of and in line with the feed-way of said rolls, a series of heating-furnaces, and one or more automatically-delivering endless billet-carriers for transferring the billets from the said furnaces to said receiving-pocket, substantially as described.

12. The combination of the continuous train of roughing-rolls, a billet-receiving pocket in front of and in line with the feedway of said rolls, a series of billet-heating furnaces placed laterally to said rolls, and one or more laterally-placed endless billet-carriers discharging into said pocket, substantially as described.

13. The combination, with the roughing-train of rolls, a billet-receiving pocket placed in the feed-line of said rolls, and the endless billet-carriers discharging into said pocket, of the reciprocating pusher, also placed in said line, substantially as described.

14. The combination, with the billet-receiving pocket having the opposite inclined receiving sides, of the detachably-fastened stop-ledge, substantially as described.

15. The combination, with the guideway-section having the slots for the feed-rolls, of the inclosing case including a space for non-conducting material and having the partitions separating said space and the roll-slots, substantially as described.

16. The combination, with the guideways having the upper and lower feed-roll slots, of said feed-rolls, the pivoted bearings for said feed-rolls, and the adjusting-screws over and under said rolls, respectively, substantially as described.

17. The combination, with two trains of rolls, of an intermediate guideway connecting said train of rolls, feeding-rolls in said guideway, and a ratchet-driver for said feed-rolls, permitting the overruning of the rods caused by the higher-speed receiving-rolls, substantially as described.

18. In a rod-rolling plant having a doubling-in train of finishing-rolls, the combination therewith of a train of strip-finishing rolls placed laterally thereto and adapted to receive the rods from an intermediate pair of said finishing-rolls, substantially as described.

19. In a rod-rolling plant having a doubling-in train of finishing-rolls, with a plurality of passes in each pair of said rolls, the combination of a continuous train of roughing-rolls located at a distance from the doubling-in train equal to or greater than the length of the bars to be delivered from the roughing-train, so that the bars run out of the roughing-train before entering the finishing-train, means for transferring the rods or bars to the said finishing-train in plurality, another train of finishing-rolls placed beyond or back of said doubling-in train, a guideway from the roughing-train to said other finishing-train and feed-rolls therein, and a switch adapted for directing some of the bars directly thereto from the roughing-train independently of said doubling-in train, substantially as described.

In testimony that I claim the foregoing as my invention I have signed my name, in presence of two witnesses, this 14th day of November, 1890.

THOMAS V. ALLIS.

Witnesses:
ANSON P. THAYER,
W. J. MORGAN.